(12) United States Patent
Fang (10) Patent No.: US 10,795,495 B2
(45) Date of Patent: Oct. 6, 2020

(54) TOUCH DETECTION METHOD WITH IMPROVED DETECTION SPEED, TOUCH CONTROL CHIP AND TOUCH DETECTION APPARATUS

(71) Applicant: SHENZHEN GOODIX TECHNOLOGY CO., LTD., Shenzhen (CN)

(72) Inventor: Jun Fang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 33 days.

(21) Appl. No.: 16/265,841

(22) Filed: Feb. 1, 2019

(65) Prior Publication Data

US 2019/0179479 A1 Jun. 13, 2019

Related U.S. Application Data

(63) Continuation of application No. PCT/CN2017/115591, filed on Dec. 12, 2017.

(51) Int. Cl.
 *G06F 3/041* (2006.01)
 *G06F 3/044* (2006.01)
(52) U.S. Cl.
 CPC ............ *G06F 3/0416* (2013.01); *G06F 3/044* (2013.01); *G06F 3/04166* (2019.05)
(58) Field of Classification Search
 CPC ..... G06F 3/044; G06F 3/0416; G06F 3/04166
 See application file for complete search history.

(56) References Cited

U.S. PATENT DOCUMENTS

| | | | |
|---|---|---|---|
| 8,482,544 B2 | 7/2013 | Land et al. | |
| 8,570,301 B2 | 10/2013 | Land et al. | |
| 2011/0006832 A1 | 1/2011 | Land et al. | |
| 2012/0081335 A1 | 4/2012 | Land et al. | |
| 2013/0033445 A1* | 2/2013 | Lin | G06F 3/0416 345/173 |
| 2016/0139730 A1* | 5/2016 | Kida | G06F 3/03545 345/174 |
| 2017/0139501 A1 | 5/2017 | Dinu | |
| 2018/0321785 A1* | 11/2018 | Hamaguchi | G02F 1/13338 |

FOREIGN PATENT DOCUMENTS

| | | |
|---|---|---|
| CN | 101950215 A | 1/2011 |
| CN | 102902426 A | 1/2013 |
| CN | 102915163 A | 2/2013 |

* cited by examiner

*Primary Examiner* — Yaron Cohen (57) ABSTRACT

The present disclosure discloses a touch detection method which includes: inputting, by a driving unit, driving signals to N driving channels, respectively; receiving, by a sensing unit, sensing signals output by M−K sensing channels; switching, by a switching unit, the N driving channels to N sensing channels, and switching other K sensing channels to K driving channels; inputting, by the driving unit, driving signals to the K driving channels after the switching, respectively; receiving, by the sensing unit, sensing signals output by the N sensing channels after the switching; and determining, by a processing unit, touch information according to the sensing signals output by the M−K sensing channels and the sensing signals output by the N sensing channels after the switching. Therefore, time consumption is reduced and a detection speed of touch detection is improved in a case where sensing channels sampled at one time are insufficient.

17 Claims, 5 Drawing Sheets

TOUCH DETECTION METHOD WITH IMPROVED DETECTION SPEED, TOUCH CONTROL CHIP AND TOUCH DETECTION APPARATUS

CROSS-REFERENCE TO RELATED APPLICATIONS

This application is a continuation of International Application No. PCT/CN2017/115591, filed on Dec. 12, 2017, the disclosure of which is hereby incorporated by reference in its entirety.

TECHNICAL FIELD

The present disclosure relates to the field of information technologies, and in particular, to a touch control chip, a touch detection method and apparatus and a terminal device.

BACKGROUND

With the development of human-machine interface technologies, the touch sensing technology has been widely applied due to comfort and convenience of operation thereof. In particular, the capacitive touch control technology has been widely applied to electronic devices, such as a notebook, a mobile phone, and an MP3 player.

A capacitive touch screen consists of a touch sensor and a touch controller, a panel of the touch sensor consists of a set of sensing channels and a set of driving channels, and positions where these driving channels and sensing channels intersect form several capacitance sensing nodes. When there is a touch, a capacitance value of a capacitance sensing node at a corresponding position changes, and the touch controller can determine the corresponding touch position by detecting the change of the capacitance in real time, and calculate a point coordinate of the panel corresponding to the touch position, thereby generating a corresponding touch event.

After the capacitive touch screen is designed, a number of the sensing channels and a number of the driving channels have been determined. However, a number of the sensing channels per sampling is limited by the number of the original sensing channels itself. Therefore, when touch detection is performed, there may be a case where a number of sensing channels sampled at one time is insufficient. For example, there are 20 driving channels and 34 sensing channels, however, when sensing signals output by at most 32 sensing channels can only be detected at a time, the 20 driving channels are all required to perform driving twice to obtain the sensing signals output by the 32 sensing channels and sensing signals output by 2 sensing channels, respectively, thereby greatly increasing time of the touch detection, affecting a refresh rate, and ultimately affecting user experience.

SUMMARY

Embodiments of the present disclosure provide a touch control chip, a touch detection method and apparatus and a terminal device, which could reduce time of touch detection and improve a detection rate of the touch detection in a case where sensing channels sampled at one time are insufficient.

According to a first aspect, a method of touch detection is provided, where the method is performed by a touch control chip, the touch control chip includes a driving unit, a sensing unit, a switching unit and a processing unit. The sensing unit is capable of receiving sensing signals output by at most A sensing channels at a time, and the method includes: inputting, by the driving unit, driving signals to N driving channels of a touch screen, respectively, where the touch screen has the N driving channels and M sensing channels, M and N being positive integers; receiving, by the sensing unit, sensing signals output by M−K sensing channels of the touch screen when the driving unit inputs the driving signals to the N driving channels, respectively, where M−K is less than or equal to A, and A is less than M; switching, by the switching unit, the N driving channels to N sensing channels, and switching K sensing channels in the M sensing channels except the M−K sensing channels to K driving channels; inputting, by the driving unit, driving signals to the K driving channels after the switching, respectively; receiving, by the sensing unit, sensing signals output by the N sensing channels after the switching when the driving unit inputs the driving signals to the K driving channels after the switching, respectively; and determining, by the processing unit, touch information on the touch screen according to the sensing signals output by the M−K sensing channels and the sensing signals output by the N sensing channels after the switching.

In an embodiment of the present disclosure, when a touch control chip needs to collect sensing signals output by M sensing channels and the touch control chip is capable of only collecting sensing signals output by at most M−K sensing channels at one time, that is, when the touch control chip insufficiently sample sensing channels at one time, firstly, driving signals are respectively input to N driving channels and the sensing signals output by the M−K sensing channels are collected, which takes N×T; secondly, the N driving channels are switched to sensing channels and the remaining K sensing channels are switched to driving channels; finally, driving signals are respectively input to K driving channels formed after the switching and sensing signals output by N sensing channels formed after the switching are collected, which takes K×T. It can be seen that the time taken to perform one detection by using a touch detection method in the embodiment of the present disclosure is N×T+K×T; however, the time taken to perform touch detection in an existing method is 2×N×T, and in general, K is much less than N; therefore, according to the touch control chip in the embodiment of the present disclosure, by switching sensing channels and driving channels to each other at two sampling phases, time of touch detection is greatly reduced and a detection speed of the touch detection is improved.

In some possible implementation manners, K is a positive integer less than or equal to N.

In some possible implementation manners, the determining, by the processing unit, the touch information on the touch screen according to the sensing signals output by the M−K sensing channels and the sensing signals output by the N sensing channels after the switching, includes: adjusting, by the processing unit, the sensing signals output by the N sensing channels after the switching according to the sensing signals output by the M−K sensing channels; and determining, by the processing unit, the touch information on the touch screen according to the sensing signals output by the M−K sensing channels and the adjusted sensing signals output by the N sensing channels.

In some possible implementation manners, the adjusting, by the processing unit, the sensing signals output by the N sensing channels after the switching according to the sensing signals output by the M−K sensing channels, includes: adjusting, by the processing unit, an average value of N sensing signals corresponding to i-th sensing channel in the K sensing channels to be equal to an average value of N sensing signals corresponding to any one of the M−K sensing channels, i being from 1 to K.

In some possible implementation manners, the adjusting, by the processing unit, the average value of the N sensing signals corresponding to the i-th sensing channel in the K sensing channels to be equal to the average value of the N sensing signals corresponding to any one of the M−K sensing channels, includes: calculating, by the processing unit, an adjustment parameter $P_i$ corresponding to the i-th sensing channel in the K sensing channels, where $P_i$ is equal to a ratio between the average value of the N sensing signals corresponding to any one of the M−K sensing channels and the average value of the N sensing signals corresponding to the i-th sensing channel; and adjusting, by the processing unit, a signal value Q of each of the N sensing signals corresponding to the i-th sensing channel to $Q \times P_i$.

In some possible implementation manners, the driving unit inputs driving signals to the N driving channels and the K driving channels after the switching, respectively by using at least one of the following manners: a single channel single frequency driving manner, a dual channel dual frequency driving manner, a multi-channel single frequency driving manner, and a multi-channel dual frequency driving manner.

According to a second aspect, a touch control chip is provided, the touch control chip including modules configured to perform methods in the first aspect or in any one of possible implementation manners of the first aspect, where a driving unit is configured to input driving signals to N driving channels of a touch screen, respectively, where the touch screen has the N driving channels and M sensing channels, M and N being positive integers; a sensing unit is configured to receive sensing signals output by M−K sensing channels of the touch screen when the driving unit inputs the driving signals to the N driving channels, respectively, where M−K is less than or equal to A, the sensing unit is capable of receiving sensing signals output by at most A sensing channels at a time, and A is less than M; a switching unit is configured to switch the N driving channels to N sensing channels, and switch K sensing channels in the M sensing channels except the M−K sensing channels to K driving channels; the driving unit is further configured to input driving signals to the K driving channels after the switching, respectively; the sensing unit is further configured to receive sensing signals output by the N sensing channels after the switching when the driving unit inputs the driving signals to the K driving channels after the switching, respectively; and a processing unit is configured to determine touch information on the touch screen according to the sensing signals output by the M−K sensing channels and the sensing signals output by the N sensing channels after the switching.

In an embodiment of the present disclosure, when a touch control chip needs to collect sensing signals output by M sensing channels and the touch control chip is capable of only collecting sensing signals output by at most M−K sensing channels at one time, that is, when the touch control chip insufficiently sample sensing channels at one time, firstly, driving signals are respectively input to N driving channels and the sensing signals output by the M−K sensing channels are collected, which takes N×T; secondly, the N driving channels are switched to sensing channels and the remaining K sensing channels are switched to driving channels; finally, driving signals are respectively input to K driving channels formed after the switching and sensing signals output by N sensing channels formed after the switching are collected, which takes K×T. It can be seen that the time taken to perform one detection by using a touch control chip in the embodiment of the present disclosure is N×T+K×T; however, the time taken to perform touch detection in an existing method is 2×N×T, and in general, K is much less than N; therefore, according to the touch control chip in the embodiment of the present disclosure, by switching sensing channels and driving channels to each other at two sampling phases, time of touch detection is greatly reduced and a detection speed of the touch detection is improved.

In some possible implementation manners, K is a positive integer less than or equal to N.

In some possible implementation manners, the processing unit is specifically configured to: adjust the sensing signals output by the N sensing channels after the switching according to the sensing signals output by the M−K sensing channels; and determine the touch information on the touch screen according to the sensing signals output by the M−K sensing channels and the adjusted sensing signals output by the N sensing channels.

In some possible implementation manners, the processing unit is specifically configured to: adjust an average value of N sensing signals corresponding to i-th sensing channel in the K sensing channels to be equal to an average value of N sensing signals corresponding to any one of the M−K sensing channels, i being from 1 to K.

In some possible implementation manners, the processing unit is specifically configured to: calculate an adjustment parameter $P_i$ corresponding to the i-th sensing channel in the K sensing channels, where $P_i$ is equal to a ratio between the average value of the N sensing signals corresponding to any one of the M−K sensing channels and the average value of the N sensing signals corresponding to the i-th sensing channel; and adjust a signal value Q of each of the N sensing signals corresponding to the i-th sensing channel to $Q \times P_i$.

In some possible implementation manners, the driving unit inputs driving signals to the N driving channels and the K driving channels after the switching, respectively by using at least one of the following manners: a single channel single frequency driving manner, a dual channel dual frequency driving manner, a multi-channel single frequency driving manner, and a multi-channel dual frequency driving manner.

According to a third aspect, a touch detection apparatus is provided, the apparatus including the touch control chip provided in the second aspect and a touch screen, where the touch screen includes driving channels and sensing channels, the driving channels are configured to receive driving signals output by a driving unit of the touch control chip, and the sensing channels are configured to output sensing signals to a sensing unit of the touch control chip.

According to a fourth aspect, a terminal device is provided, the terminal device including the touch detection apparatus provided in the foregoing third aspect, or including the touch control chip provided in the foregoing second aspect.

According to a fifth aspect, a computer readable medium is provided, for storing a computer program, where the computer program includes an instruction for executing a method in the first aspect or any possible implementation manner of the first aspect.

DETAILED DESCRIPTION

To facilitate understanding, an exemplary diagram of a system architecture of a touch screen and a touch control chip that are capable of applying a method of touch detection according to embodiments of the present disclosure is generally described firstly. It should be understood that, a method of touch detection according to the embodiments of the present disclosure is not limited to the system architecture shown in FIG. 1, that is, except for detecting a touch point of a touch screen shown in FIG. 1, the method of touch detection according to the embodiments of the present disclosure may further be used for detecting a touch point of a touch screen with another structure.

Figure 1:
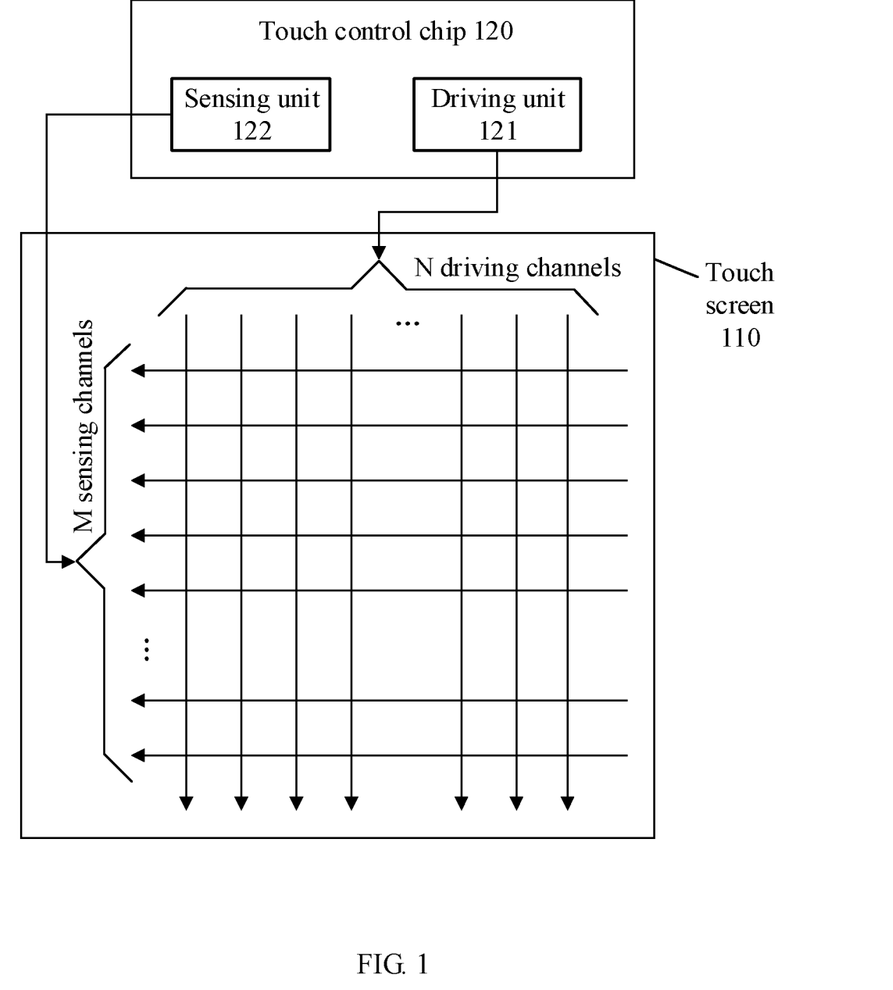
FIG. 1 is a schematic diagram of a le of touch detection.

A system shown in FIG. 1 includes a touch screen 110 and a touch control chip 120. The touch screen may also be referred to as a touch panel. The touch screen 110 may be a capacitive touch screen, and in particular, may be a projected mutual capacitance touch screen. The touch screen 110 includes N driving channels and M sensing channels. The touch controller 120 includes a driving unit 121 and a sensing unit 122. Optionally, in the embodiments of the present disclosure, the driving unit may also be referred to as a driving circuit, and the sensing unit may also be referred to as a sensing circuit.

The touch control chip 120 may also referred to as a touch controller or a touch detection module, the driving unit 121 included in the touch control chip 120 is connected to the N driving channels of the touch screen 110, and the sensing unit 122 of the touch control chip 120 is connected to the M sensing channels of the touch screen 110.

The driving unit 121 of the touch control chip 120 is configured to input driving signals (or referred to as driving signals) to the N driving channels of the touch screen 110, and the sensing unit 122 of the touch control chip 120 is configured to receive or sense sensing signals output by the M sensing channels of the touch screen.

The N driving channels of the touch screen 110 receive the driving signals input by the driving unit 121 of the touch control chip 120, and the M sensing channels of the touch screen 110 output the sensing signals to the sensing unit 122 of the touch control chip 120 when the driving unit 121 of the touch control chip 120 inputs a driving signal to some driving channel of the touch screen 110.

At present, the driving unit 121 of the touch control chip 120 inputs a driving signal to any one of the N driving channels of the touch screen 110 during one scan period when the touch control chip 120 detects a touch point on the touch screen 110, and the driving channel of the touch screen 110 receives the driving signal. Since there are coupling capacitances between the driving channels and the sensing channels on the touch screen, the sensing channels may sense signals from the driving channels, that is, coupling signals of the driving signals may be generated on the sensing channels, and the coupling signals are also referred to as sensing signals in the embodiments of the present disclosure. Then, the M sensing channels of the touch screen 110 output sensing signals respectively generated on the M sensing channels to the sensing unit of the touch control chip 120 sequentially, and the sensing unit of the touch control chip 120 receives the sensing signals respectively output by the M sensing channels. Finally, the touch control chip 120 calculates a position of the touch point on the touch screen according to all sensing signals received from the M sensing channels after the driving unit 121 of the touch control chip 120 inputs the driving signals to the N driving channels of the touch screen 110, respectively.

It should be noted that, the plurality of driving channels and the plurality of sensing channels shown in FIG. 1 are perpendicularly intersected with each other and distributed, however, this is only an exemplary description; the driving channels are distributed in the same plane (for example, denoted as a plane #1), the sensing channels are distributed in another plane (for example, denoted as a plane #2), and the two planes (i.e., the plane #1 and the plane #2) are stacked up and down. The stacking of the two planes may enable the driving channels to be distributed perpendicularly to the sensing channels, and there is a coupling capacitance at an intersection point of each driving channel and each sensing channel. It should be understood that, the distribution of the driving channels and the sensing channels in perpendicular to each other is only a possible implementation manner for touch detection, and it does not set any limitation to the present disclosure. As long as there is an intersection point that may generate a mutual capacitance between each driving channel and each sensing channel, and intersection points of the plurality of driving channels and the plurality of sensing channels may be evenly distributed below the entire touch screen, all of them should fall into the protection scope of the present disclosure. In the embodiments of the present disclosure, for convenience of description, the intersection points of the driving channels and the sensing channels may be denoted as capacitance nodes, or referred to as capacitance sensing nodes, sensing nodes, mutual coupling capacitance nodes or the like hereinafter.

It is assumed that a duration for which the driving unit 121 of the touch control chip 120 outputs a driving signal to one driving channel of the touch screen 110 is T, and the M sensing channels of the touch screen 110 output a total of M sensing signals to the sensing unit of the touch control chip 120 during T. Therefore, the sensing unit of the touch control chip 120 receives a total of N×M sensing signals output by the M sensing channels of the touch screen 110 after the driving unit 121 of the touch control chip 120 outputs the driving signals to the N driving channels of the touch screen 110, respectively, and the total time is T×N.

It is assumed that N=20 and M=34, that is, the touch screen 110 has 20 driving channels and 34 sensing channels (20 TX+34 RX), and sensing signals output by at most 32 sensing channels can be collected at one time.

When the driving unit inputs a driving signal to TX0, TX1 to TX19 are in a grounded state and there is no signal input. In this case, RX0 to RX31 receive signals from TX0, and thus sensing signals respectively generated between TX0 and RX0 to RX31 can be detected, which takes T. Since the touch control chip 120 is capable of only detecting sensing signals output by at most 32 sensing channels at one time, it is necessary to further input a driving signal to TX0 again for scanning in order to detect sensing signals generated between TX0 and the remaining two sensing channels RX32 and RX33, which takes T again.

That is to say, for one TX channel, it is necessary to scan twice in order to completely detect the sensing signals respectively generated between the driving channel TX0 and the sensing channels RX0 to RX33, which takes 2 T. Then, for the 20 driving channels, it takes 40 T.

It can be seen that it is necessary to take 20 T to completely detect all sensing signals generated between each of the 20 driving channels and the 32 sensing channels when touch detection of 20 TX+32 RX is performed. However, when the touch detection of 20 TX+32 RX is performed, since the sensing unit is capable of only completely detecting at most 32 sensing channels at one time, for any one of the 20 driving channels, it is necessary to drive signals twice to completely detect the 34 sensing channels, and then it is necessary to take 20×2T=40 T to completely detect all sensing signals generated between each of the 20 driving channels and the 34 sensing channels, which doubles the time. That has a great impact on a refresh rate, power consumption and a response time of the touch control chip, and ultimately affects user experience.

Embodiments of the present disclosure provide a touch control chip and a touch detection method, and a speed of touch detection could be improved by switching sensing channels and driving channels in a case where the sensing channels sampled at one time are insufficient.

Figure 2:
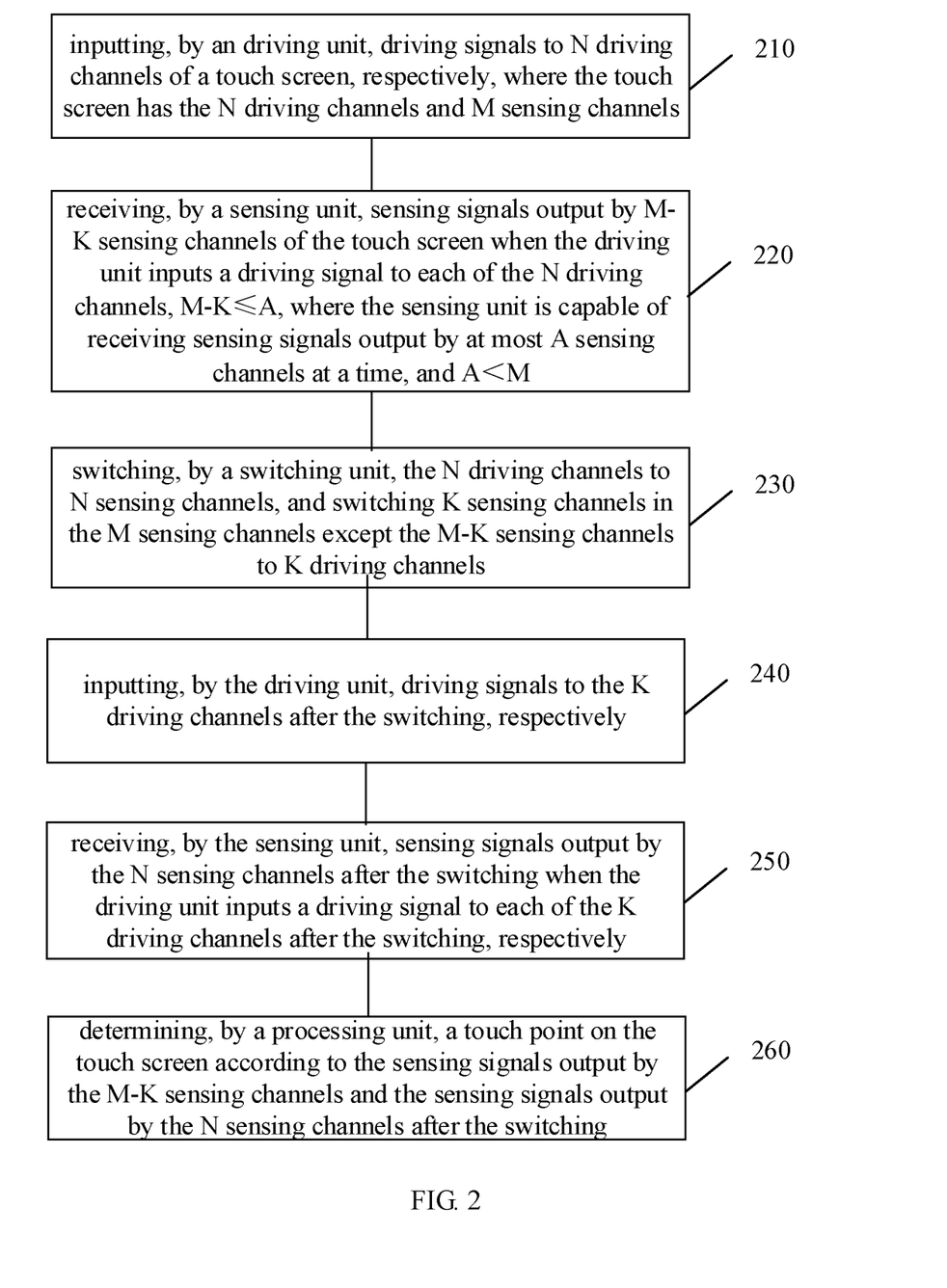
FIG. 2 is a schematic flowchart of a method of touch detection according to an embodiment of the present disclosure.

An embodiment of the present disclosure provides a method of touch detection, and a schematic flowchart of the method is shown in FIG. 2. It should be understood that, FIG. 2 illustrates steps or operations of the method of touch detection, however, these steps or operations are only exemplary; and other operations or variations of various operations in FIG. 2 may be further performed according to the method of touch detection according to the embodiment of the present disclosure. Moreover, various steps in FIG. 2 may be performed in an order different from the order presented in FIG. 2, and it is possible that not all operations in FIG. 2 are performed.

The method shown in FIG. 2 may be performed by a touch control apparatus, the touch control apparatus includes but is not limited to a touch control chip, and it is taken as an example for description below that a touch control chip performs the method. The touch control chip may include a driving unit, a sensing unit, a switching unit and a processing unit, and the sensing unit is capable of receiving sensing signals output by at most A sensing channels at a time.

In 210, the driving unit inputs driving signals to N driving channels of a touch screen, respectively.

The touch screen has the N driving channels and M sensing channels, M and N being positive integers.

In 220, the sensing unit receives sensing signals output by M−K sensing channels of the touch screen when the driving unit inputs the driving signals to the N driving channels, respectively.

M−K is less than or equal to A, A is a maximum number of sensing channels corresponding to sensing signals that the sensing unit is capable of receiving at a time, and A is less than M.

That is to say, the sensing unit is capable of receiving the sensing signals output by at most A sensing channels at a time, and M−K is less than or equal to A. Preferably, M−K=A. The following is described by taking M−K=A as an example.

Optionally, K is a positive integer less than or equal to N.

In some cases, although the touch screen has the M sensing channels, the sensing unit is capable of detecting the sensing signals output by at most M−K sensing channels when a driving signal is input to any one of the N driving channels. In this case, in 210, the driving unit first inputs the driving signals to the N driving channels, respectively; and when the driving unit inputs a driving signal to each driving channel, each of the M−K sensing channels senses a coupling signal of the driving signal on the driving channel, and the coupling signal is output to the sensing unit as a sensing signal. Then, the sensing unit can obtain the sensing signals output by the M−K sensing channels when the driving unit inputs the driving signal to each driving channel. Since the time taken by the driving unit to input the driving signal to each driving channel is T, it is necessary to take N×T for the N driving channels.

However, since K sensing channels are remained in the M sensing channels in the touch screen after the sensing unit completely detects the sensing signals output by the M−K sensing channels, it is necessary to then collect sensing signals output by the K sensing channels, that is, to perform 230 to 250.

In 230, the switching unit switches the N driving channels to N sensing channels, and switches the K sensing channels in the M sensing channels except the M−K sensing channels to K driving channels.

Particularly, the switching unit can perform the switching by controlling internal circuits to switch the N driving channels to the N sensing channels, and switch the K sensing channels in the M sensing channels except the M−K sensing channels to driving channels, so as to form the N sensing channels after the switching and the K driving channels after the switching. Here, optionally, K≤N.

In 240, the driving unit inputs driving signals to the K driving channels after the switching, respectively.

In 250, the sensing unit receives sensing signals output by the N sensing channels after the switching when the driving unit inputs the driving signals to the K driving channels after the switching, respectively.

Particularly, the driving unit inputs the driving signals to the K driving channels after the switching, respectively after the switching unit switches the sensing channels and the driving channels to each other; and when the driving unit inputs a driving signal to each driving channel, each of the N sensing channels after the switching senses a coupling signal of the driving signal on the driving channel, and the coupling signal is output to the sensing unit as a sensing signal. Then, the sensing unit can obtain the sensing signals output by the N sensing channels after the switching when the driving unit inputs the driving signal to each driving channel. Since the time taken by the driving unit to input the driving signal to each driving channel is T, it is necessary to take K×T for the K driving channels.

In 260, the processing unit determines touch information on the touch screen according to the sensing signals output by the M−K sensing channels and the sensing signals output by the N sensing channels after the switching.

In the foregoing process, it is necessary to take a total of N×T+K×T to completely detect the sensing signals output by the M−K sensing channels and the sensing signals output by the N sensing channels after the switching.

It should be understood that, when K≤N, the use of the method according to the embodiment of the present disclosure could significantly reduce time of touch detection. In comparison to a manner in which the driving signals are respectively input to the N driving signals to collect the sensing signals output by the K sensing channels, the time for detection is reduced from N×T to K×T.

It should also be understood that, when K>N, after 210 and 220 are performed, the driving unit may input the driving signals to the N driving channels, and the sensing unit receives the sensing signals output by the remaining K sensing channels when the driving unit inputs a driving signal to each of the N driving channels, which takes N×T.

In an embodiment of the present disclosure, when a touch control chip needs to collect sensing signals output by M sensing channels and the touch control chip is capable of only collecting sensing signals output by at most M−K sensing channels at one time, that is, when the touch control chip insufficiently sample sensing channels at one time, firstly, driving signals are respectively input to N driving channels and the sensing signals output by the M−K sensing channels are collected, which takes N×T; secondly, the N driving channels are switched to sensing channels and the remaining K sensing channels are switched to driving channels; finally, driving signals are respectively input to K driving channels formed after the switching and sensing signals output by N sensing channels formed after the switching are collected, which takes K×T. It can be seen that the time taken to perform one detection by using a method of touch detection in the embodiment of the present disclosure is N×T+K×T; however, the time taken to perform touch detection in an existing method is 2×N×T, and in general, K is much less than N; therefore, according to the touch control chip in the embodiment of the present disclosure, by switching sensing channels and driving channels to each other at two sampling phases, time of touch detection is greatly reduced and a detection speed of the touch detection is improved.

A method of touch detection according to an embodiment of the present disclosure will be described in detail below by taking FIG. 3(a) and FIG. 3(b) as examples. The method may be performed by a touch control chip, and the touch control chip includes a driving unit, a sensing unit, a switching unit and a processing unit, where the driving unit is configured to input driving signals to driving channels, the sensing unit is configured to receive sensing signals output by sensing channels, and the switching unit is configured to switch the driving channels to sensing channels, and switch the sensing channels to driving channels.

It is assumed that a touch screen to be detected includes 20 driving channels (TX0 to TX19) and 34 sensing channels (RX0 to RX33), that is, N=20, M=34; however, the sensing unit is capable of only detecting sensing signals output by at most 32 sensing channels at a time, that is, A=32, assuming K=2.

Figure 3A:
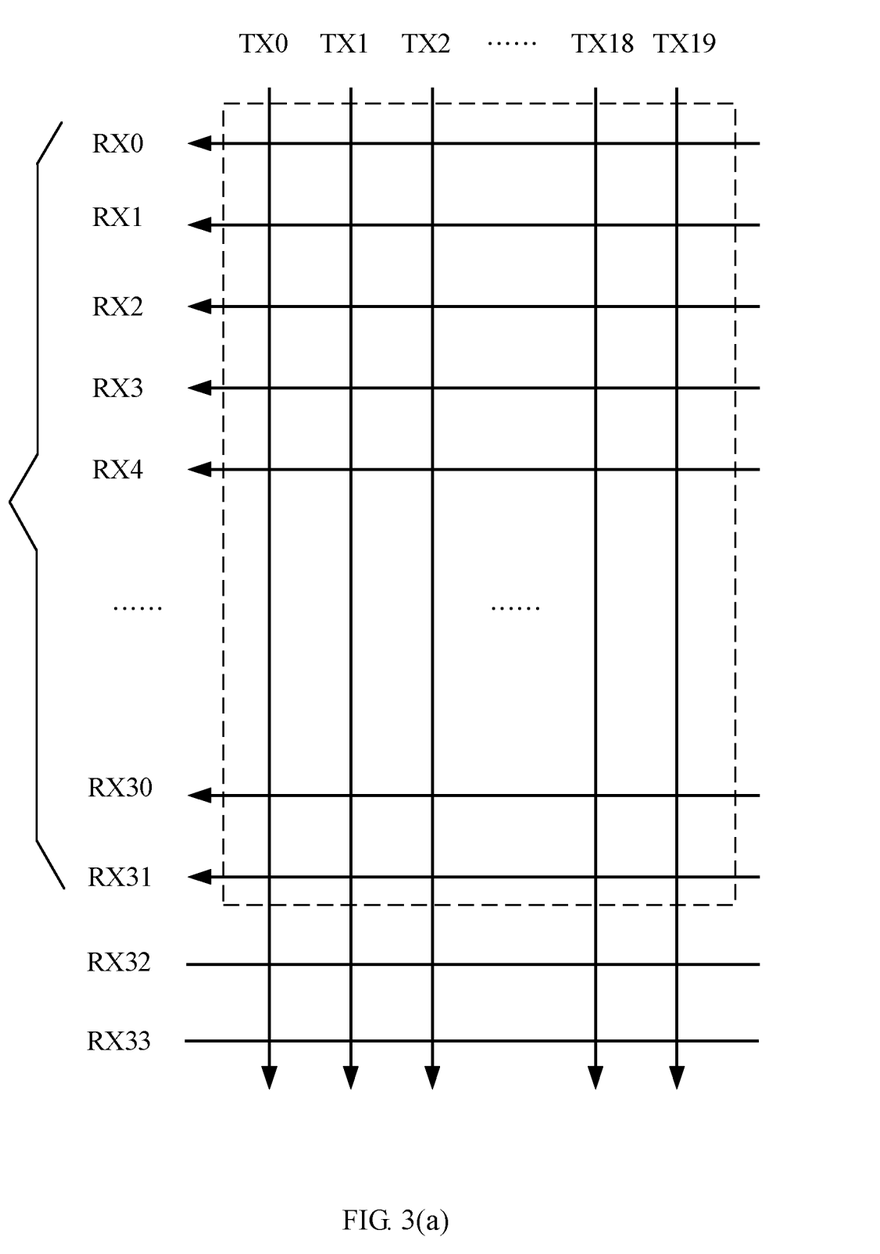
FIG. 3(a) is schematic diagram of collection of sensing signals of M–K sensing channels in an embodiment of the present disclosure.

As shown in a dashed box in FIG. 3(a), the driving unit first inputs a driving signal to TX0 in the N driving channels, and the 32 sensing channels RX0 to RX31 can output sensing signals to the sensing unit, which takes T; next, the driving unit inputs a driving signal to TX1 in the N driving channels, and the 32 sensing channels RX0 to RX31 can output sensing signals to the sensing unit, which takes also T; and in the same manner, the driving unit sequentially inputs driving signals to TX2, TX3, . . . , TX19, respectively, the 32 sensing channels may output corresponding sensing signals to the sensing unit after the driving unit inputs a driving signal to each driving channel, and the whole process takes a total of 20 T.

In this case, there are still 2 sensing channels (RX32 and RX33) remained undetected.

The switching unit switches the 20 driving channels (TX0 to TX19) to sensing channels, which are respectively denoted as RX0 to RX 19, and switches the remaining 2 sensing channels (RX32 and RX33) to 2 driving channels, which are respectively denoted as TX32 and TX33.

Figure 3B:
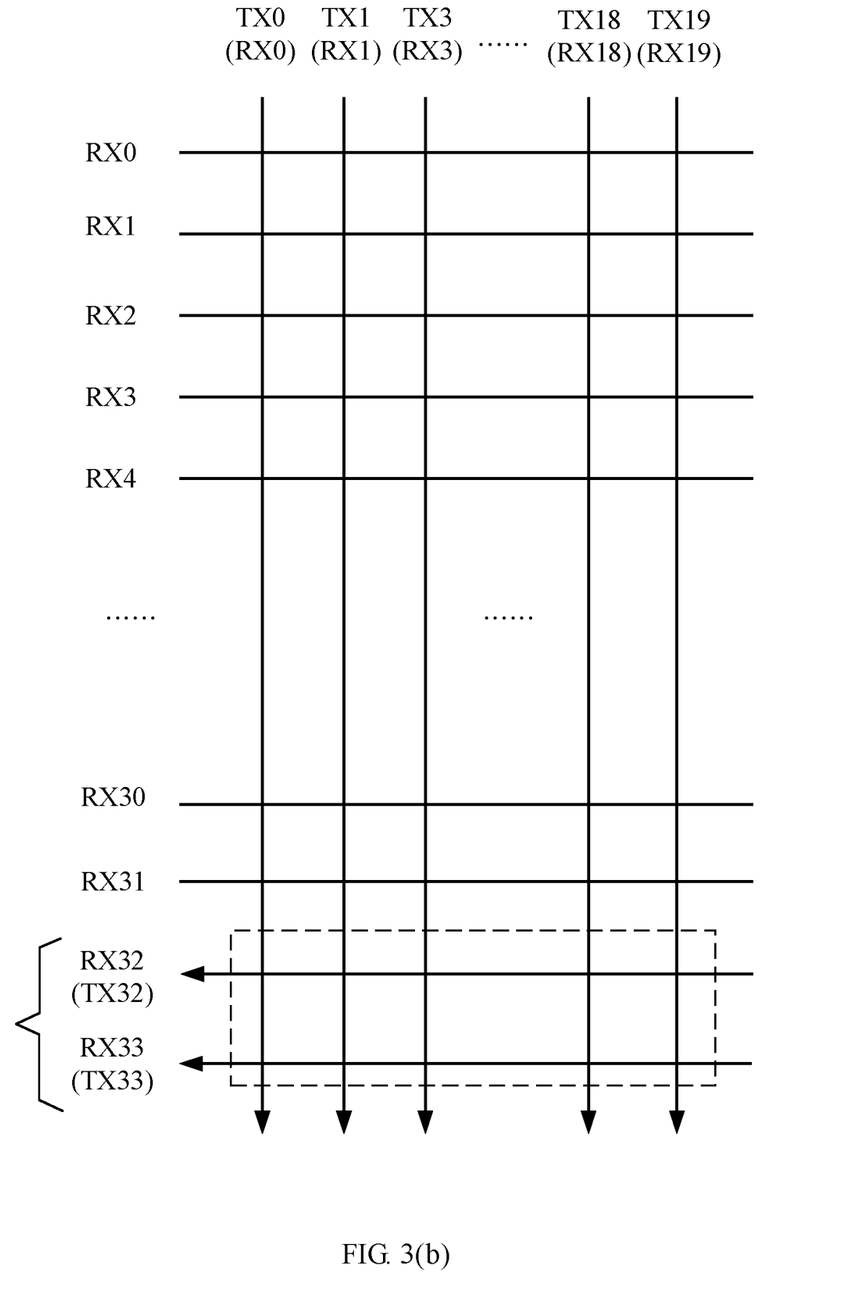
FIG. 3(b) is schematic diagram of collection of sensing signals of K sensing channels in an embodiment of the present disclosure.

As shown in a dashed box in FIG. 3(b), the driving channels input driving signals to T32 of the two driving channels after the switching, and then sensing signals outputted by the sensing channels RX0 to RX19 are received, which takes T. The driving channels input driving signals to T33 of the two driving channels after the switching, and sensing signals output by the sensing channels RX0 to RX19 are received, which takes T. In this case, detection of the remaining 2 sensing channels RX32 and RX33 is completed, which takes a total of 2 T.

The collection for the entire screen takes a total of 20 T+2 T=22 T.

It can be seen that if a conventional manner is adopted, it is necessary to take 20 T that the driving unit inputs the driving signals to the 20 driving channels, respectively and the sensing signals output by the 32 sensing channels are received; then, it is also necessary to take 20 T that the driving unit inputs the driving signals to the 20 driving channels, respectively and the sensing signals output by the remaining 2 sensing channels are received; and the whole process takes a total of 40 T. Therefore, by comparison, the use of the method of touch detection method according to the embodiment of the present disclosure could save a lot of time and improve detection efficiency of the touch detection.

In the embodiment of the present disclosure, the sensing channels and the driving channels in the touch screen can be switched to each other.

For example, the embodiment of the present disclosure can be applied in the following scene: the touch screen originally includes N+K driving channels and M−K sensing channels; now it is necessary to increase a number of the sensing channels, for example, adding K sensing channels; then, K driving channels in the N+K driving channels can be switched to sensing channels for use through switching by internal circuits, so that the number of the channels in the touch screen are changed from the original N+K driving channels and M−K sensing channels to the current N driving channels and M sensing channels. In this case, since a number of the sensing channels per sampling is limited by the number of the sensing channels M−K itself, that is, when a driving signal is input to a certain driving channel, the sensing unit is capable of only detecting sensing signals output by at most the M−K sensing channels. In this scene, if the method according to the embodiment of the present disclosure is used, time of touch detection could be greatly reduced.

Optionally, 260 further includes 261 and 262, where:

in 261, the processing unit adjusts the sensing signals output by the N sensing channels after the switching according to the sensing signals output by the M−K sensing channels.

In 262, the processing unit determines the touch information on the touch screen according to the sensing signals output by the M−K sensing channels and the adjusted sensing signals output by the N sensing channels.

In view of that there may be a difference between a level of signal values of the sensing signals output by the M−K sensing channels and a numerical level of signal values (for example, capacitance values of coupling capacitances) of the sensing signals output by the N sensing channels after the switching, that may cause that there is a difference between touch performance of an area in the touch screen corresponding to the M−K sensing channels and touch performance of an area in the touch screen corresponding to the N sensing channels after the switching, for example, the two areas are different in sensitivity, accuracy of finger pressing and the like.

For example, sensing signals outputted on an area indicated in the dashed box in FIG. 3(a) are the sensing signals outputted by the M-K sensing channels; and sensing signals output on an area indicated in the dashed box in FIG. 3(b) are the sensing signals outputted by the N sensing channels after the switching. Since there is a difference between numerical levels of signal values of the sensing signals generated on the sensing channels in the two areas, for example, in these two areas, there is a difference between average values of N sensing signals corresponding to sensing channels in different areas, there is a difference between the touch performance of the corresponding two areas in the touch screen, thereby affecting user experience.

In this case, according to the method of touch detection of the embodiment of the present disclosure, a signal value of a sensing signal output by each of the N sensing channels after the switching may be adjusted, so that the numerical level of the signal values of the sensing signals output by the N sensing channels after the switching is approximately equal to the numerical level of the signal values of the sensing signals output by the M-K sensing channels.

For example, the processing unit adjusts an average value of N sensing signals corresponding to i-th sensing channel in the K sensing channels to be equal to an average value of N sensing signals corresponding to any one of the M-K sensing channels, i being from 1 to K.

That is to say, after the sensing unit obtains the sensing signals output by the M-K sensing channels and the sensing signals output by the N sensing channels, the signal values of the sensing signals output by the N sensing channels may be adjusted according to the signal values of the sensing signals output by the M-K sensing channels, so that the average value of the signal values of the N sensing signals corresponding to the i-th sensing channel in the K sensing channels is equal to the average value of the signal values of the N sensing signals corresponding to any one of the M-K sensing channels.

For example, signal values of sensing signals generated at capacitance nodes between the sensing channels and the driving channels in the dashed box in FIG. 3(b) may be adjusted, so that a numerical level of the signal values thereof is quite equal to a numerical level of signal values of sensing signals generated at capacitance nodes between the sensing channels and the driving channels in the dashed box in FIG. 3(a), thereby reducing the difference in touch performance of the two areas.

Optionally, in 262, the processing unit adjusts the average value of the N sensing signals corresponding to the i-th sensing channel in the K sensing channels to be equal to the average value of the N sensing signals corresponding to any one of the M-K sensing channels, which includes:

calculating, by the processing unit, an adjustment parameter $P_i$ corresponding to the i-th sensing channel in the K sensing channels, where $P_i$ is equal to a ratio between the average value of the N sensing signals corresponding to any one of the M-K sensing channels and the average value of the N sensing signals corresponding to the i-th sensing channel; and adjusting, by the processing unit, a signal value Q of each of the N sensing signals corresponding to the i-th sensing channel to $Q \times P_i$.

Still taking FIG. 3(a) and FIG. 3(b) as examples, it is assumed that a signal value of a sensing signal generated between each sensing channel and each driving channel in the touch screen is as shown in Table 1. N sensing signals corresponding to each of the sensing channels RX0 to RX31 may be obtained through the foregoing steps 210 and 220. N sensing signals corresponding to each of the sensing channels of RX32 and RX33 may be obtained through the foregoing steps 230 to 250.

For example, the N sensing signals corresponding to RX32 are sensing signals generated at capacitance nodes between RX32 and the N driving channels (TX0 to TX19). These sensing signals may be obtained through the foregoing steps 230 to 250. That is, RX32 is switched to a driving channel TX32, the N driving channels (TX0 to TX19) are switched to sensing channels (RX0 to RX19), a driving signal is input to the driving channel TX32 formed after the switching, and the N sensing channels (RX0 to RX19) formed after the switching output sensing signals generated at capacitance nodes between the N sensing channels (RX0 to RX19) formed after the switching and TX32, that is, the N sensing signals corresponding to RX32 are obtained. The N sensing signals corresponding to RX33 can be obtained through a similar method.

TABLE 1

|  | TX0 | TX1 | TX2 | TX3 | TX4 | ...... | TX16 | TX17 | TX18 | TX19 |
| --- | --- | --- | --- | --- | --- | --- | --- | --- | --- | --- |
| RX0 | 1411 | 1439 | 1429 | 1424 | 1188 | ...... | 1471 | 1489 | 1496 | 1578 |
| RX1 | 1467 | 1489 | 1480 | 1474 | 1461 | ...... | 1506 | 1510 | 1517 | 1583 |
| RX2 | 1456 | 1484 | 1475 | 1472 | 1469 | ...... | 1493 | 1495 | 1501 | 1560 |
| RX3 | 1462 | 1489 | 1481 | 1479 | 1475 | ...... | 1502 | 1506 | 1511 | 1569 |
| ... |  |  |  |  |  |  |  |  |  |  |
| RX30 | 1500 | 1523 | 1516 | 1511 | 1507 | ...... | 1542 | 1546 | 1554 | 1568 |
| RX31 | 1592 | 1528 | 1522 | 1513 | 1510 | ...... | 1548 | 1551 | 1559 | 1568 |
| RX32 (TX32) | 1417 | 1489 | 1447 | 1447 | 1454 | ...... | 1452 | 1439 | 1472 | 1472 |
| RX33 (TX33) | 1458 | 1507 | 1462 | 1459 | 1456 | ...... | 1440 | 1433 | 1470 | 1489 |

It can be seen from Table 1 that signal values of the N sensing signals corresponding to RX32 are slightly less than signal values of the N sensing signals corresponding to each sensing channel in RX30 to RX31, and numerical levels of the signal values of them are different; and the processing unit needs to perform fitting adjustment on the signal values of the N sensing signals corresponding to RX32 to reduce the difference.

One sensing channel, for example RX 31, is selected arbitrarily, and N sensing signals corresponding to RX31 are taken as an example; after obtaining N sensing signals corresponding to each sensing channel in RX0 to RX31 and N sensing signals corresponding to each sensing channels in RX32 and RX33, the processing unit calculates an average value of the N sensing signals corresponding to RX31, an average value of the N sensing signals corresponding to RX32, and an average value of the N sensing signals corresponding to RX33. An adjustment parameter $P_1$ corresponding to RX32 is obtained by dividing the average value of the N sensing signals corresponding to RX31 by the average value of the N sensing signals corresponding to RX32; and an adjustment parameter $P_2$ corresponding to RX33 by dividing the average value of the N sensing signals corresponding to RX31 by the average value of the N sensing signals corresponding to RX33.

That is, $P_1$=AVG(RX31)/AVG(RX32), and $P_2$=AVG (RX31)/AVG(RX33).

AVG(RX31) is the average value of the signal values of the N sensing signals corresponding to RX31, AVG(RX32) is the average value of the signal values of the N sensing signals corresponding to RX32, and AVG(RX33) is the average value of the signal values of the N sensing signals corresponding to RX33.

Next, a signal value of each of the N sensing signals corresponding to RX32 is adjusted according to $P_1$, that is, the signal value of each signal is multiplied by $P_1$. A signal value of each of the N sensing signals corresponding to RX33 is adjusted according to $P_2$, that is, the signal value of each signal is multiplied by $P_2$. The adjusted signal values of the sensing signals are shown in Table 2.

TABLE 2

| | TX0 | TX1 | TX2 | TX3 | TX4 | ...... | TX16 | TX17 | TX18 | TX19 |
|---|---|---|---|---|---|---|---|---|---|---|
| RX32 (TX32) | 1530 | 1608 | 1562 | 1562 | 1570 | ...... | 1568 | 1554 | 1589 | 1589 |
| RX33 (TX33) | 1574 | 1627 | 1578 | 1575 | 1572 | ...... | 1555 | 1547 | 1587 | 1608 |

It can be seen from Table 2 that after the fitting adjustment of data is performed, numerical levels of the signal values of the N sensing signals corresponding to RX32 and the signal values of the N sensing signals corresponding to RX33 are close to a numerical level of the signal values of the sensing signals output by RX0 to RX31, thereby narrowing the difference in touch performance of the dashed area of FIG. 3(a) and the dashed area of FIG. 3(b).

Optionally, in 620 and 640, the driving unit may input driving signals to the N driving channels and the K driving channels after the switching, respectively by using at least one of the following manners: a single channel single frequency driving manner, a dual channel dual frequency driving manner, a multi-channel single frequency driving manner, and a multi-channel dual frequency driving manner.

Taking FIG. 3(a) and FIG. 3(b) as examples, a single frequency driving manner in sequence driving (Sequence Driving, Seq Driving) is a manner of performing driving on a single channel using a single frequency. At the same moment, only one driving channel in the driving channels TX0 to TX20 is being driven at a time, other sensing channels are not driven (in a grounded state), a driving frequency is A, and RX0 to RX31 receive signals with a frequency A.

A dual frequency driving manner in the Seq Driving is a manner of performing driving on two channels using two frequencies. At the same moment, two driving channels in the driving channels TX0 to TX20 are being driven at a time, other channels are not driven (in a grounded state), one driving channel is driven using a frequency A, the other driving channel is driven using a frequency B, RX0 to RX31 receive signals with the frequency A and the frequency B, and the signals with the frequency A and the signals with the frequency B are separated inside the touch control chip. After the driving of the two driving channels is completed, other two driving channels then are selected from the remaining driving channels which have not performed driving, to continue the driving and detection until all the channels are detected completely.

Of course, similarly, a three frequency driving manner, a fourth frequency driving manner or the like may also be used. The driving may also be referred to as driving signals, that is, the foregoing process of inputting driving signals.

A multi-channel single frequency driving manner in multi-channel matrix driving (All Driving) is a manner of performing driving on multiple channels using a single frequency matrix. For example, the driving is performed on three channels at a time, and other channels may not be driven (in a grounded state) at this time. It is assumed that driving is performed on TX0, TX1 and TX2 simultaneously; at the first time, a positive phase signal is driven to TX0, a positive phase signal is driven to TX1, and a negative phase signal is driven to TX2; and the second time, a positive phase signal is driven to TX0, a negative phase signal is driven to TX1, a positive phase signal is driven to TX2; at the third time, a positive phase signal is driven to TX0, a positive phase signal is driven to TX1, and a negative phase signal is driven to TX2; and the sensing channels RX0 to RX32 receive signals three times in total, and finally signal values of sensing signals generated at capacitance nodes between TX0, TX1, TX2 and RX0 to RX32 are calculated by means of solving a matrix.

A multi-channel dual frequency driving manner in the All Driving is a manner of performing driving on multiple channels using two frequency matrixes. For example, the driving is performed on six channels, and other channels may not be driven (in a grounded state) at this time. For example, the driving may be performed on TX0, TX1, and TX2 using a frequency A, and the driving may be performed on TX3, TX4, and TX5 using a frequency B. At the first time, a positive phase signal with the frequency A is driven to TX0, a positive phase signal with the frequency A is driven to TX1, a negative phase signal with the frequency A is driven to TX2, a positive phase signal with the frequency B is driven to TX3, a positive phase signal with the frequency B is driven to TX4, and a negative phase signal with the frequency B is driven to TX5; at the second time, a positive phase signal with the frequency A is driven to TX0, a negative phase signal with the frequency A is driven to TX1, a positive phase signal with the frequency A is driven to TX2, a positive phase signal with the frequency B is driven to TX3, a negative phase signal with the frequency B is driven to TX4, and a positive phase signal with the frequency B is driven to TX5; at the third time, a negative phase signal with the frequency A is driven to TX0, a positive phase signal with the frequency A is driven to TX1, a positive phase signal with the frequency A is driven to TX2, a negative phase signal with the frequency B is driven to TX3, a positive phase signal with the frequency B is driven to TX4, and a positive phase signal with the frequency B is driven to TX5; and the sensing channels RX0 to RX32 receive signals three times in total, and finally signal values of sensing signals generated at capacitance nodes between TX0, TX1, TX2, TX3, TX4, TX5 and RX0 to RX32 are calculated by means of solving matrixes.

Of course, different driving manners may also be used when the driving signals are input to the N driving channels, respectively, and the driving signals are input to the K driving channels after the switching. For example, in the area shown in the dashed box in FIG. 3(a) and the area shown in the dashed box in FIG. 3(b), the same driving manner may be used, such as the sequence driving and multi-channel matrix driving, or different driving manners may be respectively used in the two areas, such as a mixing of these two driving manners of the sequence driving and multi-channel matrix driving.

A touch control chip according to an embodiment of the present disclosure is introduced below in conjunction with FIG. 4. It should be understood that, a touch control chip illustrated in FIG. 4 is only exemplary, the touch control chip according to the embodiment of the present disclosure may further include other modules or units, or include modules that are similar in function to various modules in FIG. 2 and FIG. 3, or not include all modules in FIG. 2 or FIG. 3.

Figure 4:
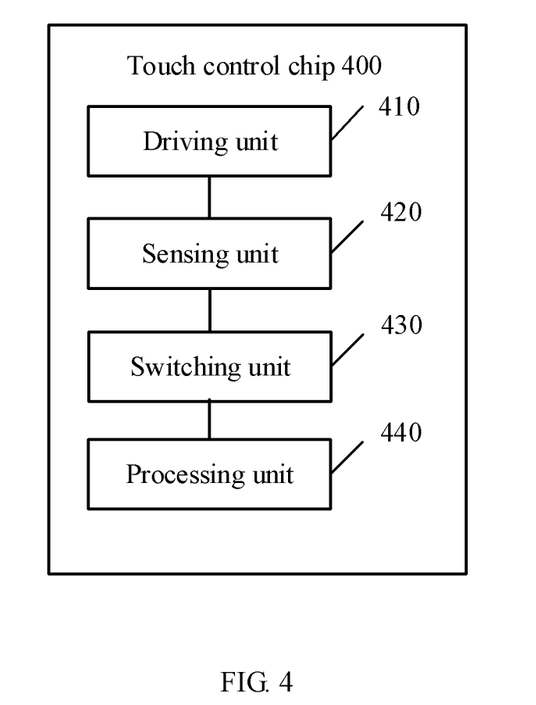
FIG. 4 is a schematic block diagram of a touch control chip according to an embodiment of the present disclosure.

FIG. 4 is a schematic block diagram of a touch control chip 400 according to an embodiment of the present disclosure. The touch control chip 400 includes a driving unit 410, a sensing unit 420, a switching unit 430 and a processing unit 440.

The driving unit 410 is configured to input driving signals to N driving channels of a touch screen, respectively, where the touch screen has the N driving channels and M sensing channels, M and N being positive integers;

the sensing unit 420 is configured to receive sensing signals output by M−K sensing channels of the touch screen when the driving unit 410 inputs the driving signals to the N driving channels, respectively, where M−K is less than or equal to A, the sensing unit 420 is capable of receiving sensing signals output by at most A sensing channels at a time, and A is less than M;

the switching unit 430 is configured to switch the N driving channels to N sensing channels, and switch K sensing channels in the M sensing channels except the M−K sensing channels to K driving channels;

the driving unit 410 is further configured to input driving signals to the K driving channels after the switching, respectively;

the sensing unit 420 is further configured to receive sensing signals output by the N sensing channels after the switching when the driving unit 410 inputs the driving signals to the K driving channels after the switching, respectively; and the processing unit 440 is configured to determine touch information on the touch screen according to the sensing signals output by the M−K sensing channels and the sensing signals output by the N sensing channels after the switching.

In an embodiment of the present disclosure, when a touch control chip needs to collect sensing signals output by M sensing channels and the touch control chip is capable of only collecting sensing signals output by at most M−K sensing channels at one time, that is, when the touch control chip insufficiently sample sensing channels at one time, firstly, driving signals are respectively input to N driving channels and the sensing signals output by the M−K sensing channels are collected, which takes N×T; secondly, the N driving channels are switched to sensing channels and the remaining K sensing channels are switched to driving channels; finally, driving signals are respectively input to K driving channels formed after the switching and sensing signals output by N sensing channels formed after the switching are collected, which takes K×T. It can be seen that the time taken to perform one detection by using a touch control chip in the embodiment of the present disclosure is N×T+K×T; however, the time taken to perform touch detection in an existing method is 2×N×T, and in general, K is much less than N; therefore, according to the touch control chip in the embodiment of the present disclosure, by switching sensing channels and driving channels to each other at two sampling phases, time of touch detection is greatly reduced and a detection speed of the touch detection is improved.

Optionally, as an embodiment, K is a positive integer less than or equal to N.

Optionally, as an embodiment, the processing unit 440 is specifically configured to: adjust the sensing signals output by the N sensing channels after the switching according to the sensing signals output by the M−K sensing channels; and determine the touch information on the touch screen according to the sensing signals output by the M−K sensing channels and the adjusted sensing signals output by the N sensing channels.

Optionally, as an embodiment, the processing unit 440 is specifically configured to: adjust an average value of N sensing signals corresponding to i-th sensing channel in the K sensing channels to be equal to an average value of N sensing signals corresponding to any one of the M−K sensing channels, i being from 1 to K.

Optionally, as an embodiment, the processing unit 440 is specifically configured to: calculate an adjustment parameter $P_i$ corresponding to the i-th sensing channel in the K sensing channels, where $P_i$ is equal to a ratio between the average value of the N sensing signals corresponding to any one of the M−K sensing channels and the average value of the N sensing signals corresponding to the i-th sensing channel; and adjust each signal value Q in N signal values corresponding to the i-th sensing channel to $Q \times P_i$.

Optionally, as an embodiment, the driving unit 410 inputs driving signals to the N driving channels and the K driving channels after the switching, respectively by using at least one of the following manners: a single channel single frequency driving manner, a dual channel dual frequency driving manner, a multi-channel single frequency driving manner, and a multi-channel dual frequency driving manner.

It should be understood that, the foregoing and other operations and/or functions of various units of the touch detection apparatus according to the embodiments of the present disclosure shown in FIG. 4 are respectively used for implementing corresponding procedures of the method of touch detection in FIG. 2, and for concision, they will not be repeated redundantly herein.

Figure 5:
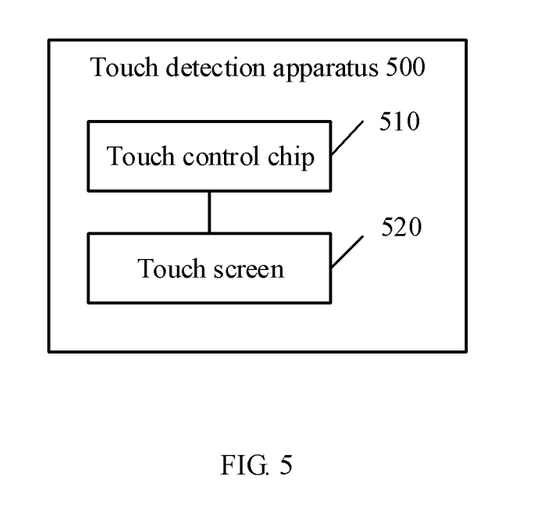
FIG. 5 is a schematic block diagram of a touch detection apparatus according to an embodiment of the present disclosure.

FIG. 5 is a schematic block diagram of a touch detection apparatus 500 according to an embodiment of the present disclosure. The touch detection apparatus 500 includes a touch screen 510 and a touch control chip 520.

The touch screen 510 includes driving channels and sensing channels, the driving channels are configured to receive driving signals output by a driving unit of the touch control chip, and the sensing channels are configured to sense coupling signals of the driving signals on the driving channels, and output the coupling signals to a sensing unit of the touch control chip as sensing signals. Optionally, the touch control chip 520 may be the touch control chip 400 described in FIG. 4. For concision, they will not be repeated redundantly herein.

An embodiment of the present disclosure further provides a terminal device, and the terminal device may include any one of the touch detection apparatuses or touch control chips of the foregoing embodiments of the present disclosure.

It should be understood that, the terminal device in the embodiment of the present disclosure may be a terminal device equipped with a fingerprint identification apparatus, such as a mobile phone, a tablet computer, or a notebook, and the terminal device may be, for example, a mobile phone equipped with a fingerprint identification chip.

Those of ordinary skill in the art may be aware that, units and algorithm steps of the examples described in the embodiments disclosed in this paper may be implemented by electronic hardware, computer software, or a combination of the two. Whether these functions are executed in hardware or software mode depends on the specific applications and design constraint conditions of the technical solutions. Those skilled may implement the described functions by using different methods for each specific application, but this implementation should not be considered to be beyond the scope of the present disclosure.

Those skilled in the art to which the present disclosure pertains may clearly understand that, for convenience and simplicity of description, for the specific working processes of the system, the apparatus and the units described above, may refer to corresponding processes in the foregoing method embodiments, and will not be repeated redundantly herein.

In the several embodiments provided in the present disclosure, it should be understood that, the disclosed system, apparatus and method may be implemented in other manners. For example, the apparatus embodiments described above are merely exemplary, e.g., the division of the units is merely a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection via some interfaces, apparatuses or units, and may be in electrical, mechanical or other forms.

The units described as separate parts may be or may not be separated physically, and a component displayed as a unit may be or may not be a physical unit, namely, may be located in one place, or may be distributed on a plurality of network units. A part of or all of the units may be selected to achieve the purposes of the solutions in the present embodiments according to actual demands.

In addition, the respective functional units in the embodiments of the present disclosure may be integrated in a detecting unit, or the respective units exist separately and physically, or two or more units are integrated in one unit.

If the functions is implemented in the form of the software functional unit and is sold or used as an independent product, it may be stored in a computer readable storage medium. Based on such understanding, the technical solutions of the present disclosure substantially, or the part of the present disclosure making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present disclosure. The foregoing storage medium includes a variety of media capable of storing program codes, such as a USB disk, a mobile hard disk, a read-only memory (Read-Only Memory, ROM), a random access memory (Random Access Memory, RAM), a magnetic disk, an optical disk or the like.

Described above are the specific embodiments of the present disclosure only, but the protection scope of the embodiments of present disclosure is not limited thereto, those skilled who are familiar with the art could readily think of variations or substitutions within the technical scope disclosed by the embodiments of the present disclosure, and these variations or substitutions shall fall within the protection scope suitable for personal interests of the present disclosure. Therefore, the protection scope of the embodiments of the present disclosure should be determined with reference to the protection scope of the claims.

The invention claimed is:

1. A method of touch detection, wherein the method is performed by a touch control chip, the touch control chip comprises a driving unit, a sensing unit, a switching unit and a processing unit, the sensing unit is capable of receiving sensing signals output by at most A sensing channels at a time, and the method comprises:
    inputting, by the driving unit, driving signals to N driving channels of a touch screen, respectively, wherein the touch screen has the N driving channels and M sensing channels, M and N being positive integers;
    receiving, by the sensing unit, sensing signals output by M−K sensing channels of the touch screen when the driving unit inputs the driving signals to the N driving channels, respectively, wherein M−K is less than or equal to A, A is less than M, and K is less than N;
    switching, by the switching unit, the N driving channels to N sensing channels, and switching K sensing channels in the M sensing channels except the M−K sensing channels to K driving channels;
    inputting, by the driving unit, driving signals to the K driving channels after the switching, respectively;
    receiving, by the sensing unit, sensing signals output by the N sensing channels after the switching when the driving unit inputs the driving signals to the K driving channels after the switching, respectively; and
    determining, by the processing unit, touch information on the touch screen according to the sensing signals output by the M−K sensing channels and the sensing signals output by the N sensing channels after the switching.

2. The method according to claim 1, wherein the determining, by the processing unit, the touch information on the touch screen according to the sensing signals output by the M−K sensing channels and the sensing signals output by the N sensing channels after the switching, comprises:
    adjusting, by the processing unit, the sensing signals output by the N sensing channels after the switching according to the sensing signals output by the M−K sensing channels; and
    determining, by the processing unit, the touch information on the touch screen according to the sensing signals output by the M−K sensing channels and the adjusted sensing signals output by the N sensing channels.

3. The method according to claim 2, wherein the adjusting, by the processing unit, the sensing signals output by the N sensing channels after the switching according to the sensing signals output by the M−K sensing channels, comprises:

adjusting, by the processing unit, an average value of N sensing signals corresponding to i-th sensing channel in the K sensing channels to be equal to an average value of N sensing signals corresponding to any one of the M−K sensing channels, i being from 1 to K.

4. The method according to claim 3, wherein the adjusting, by the processing unit, the average value of the N sensing signals corresponding to the i-th sensing channel in the K sensing channels to be equal to the average value of the N sensing signals corresponding to any one of the M−K sensing channels, comprises:

calculating, by the processing unit, an adjustment parameter $P_i$ corresponding to the i-th sensing channel in the K sensing channels, wherein $P_i$ is equal to a ratio between the average value of the N sensing signals corresponding to any one of the M−K sensing channels and the average value of the N sensing signals corresponding to the i-th sensing channel; and adjusting, by the processing unit, a signal value Q of each of the N sensing signals corresponding to the i-th sensing channel to $Q \times P_i$.

5. The method according to claim 4, wherein the driving unit inputs driving signals to the N driving channels and the K driving channels after the switching, respectively by using at least one of the following manners:

a single channel single frequency driving manner, a dual channel dual frequency driving manner, a multi-channel single frequency driving manner, and a multi-channel dual frequency driving manner.

6. The method according to claim 3, wherein the driving unit inputs driving signals to the N driving channels and the K driving channels after the switching, respectively by using at least one of the following manners:

a single channel single frequency driving manner, a dual channel dual frequency driving manner, a multi-channel single frequency driving manner, and a multi-channel dual frequency driving manner.

7. The method according to claim 2, wherein the driving unit inputs driving signals to the N driving channels and the K driving channels after the switching, respectively by using at least one of the following manners:

a single channel single frequency driving manner, a dual channel dual frequency driving manner, a multi-channel single frequency driving manner, and a multi-channel dual frequency driving manner.

8. The method according to claim 1, wherein the driving unit inputs driving signals to the N driving channels and the K driving channels after the switching, respectively by using at least one of the following manners:

a single channel single frequency driving manner, a dual channel dual frequency driving manner, a multi-channel single frequency driving manner, and a multi-channel dual frequency driving manner.

9. A touch control chip, comprising:

a driving unit configured to input driving signals to N driving channels of a touch screen, respectively, wherein the touch screen has the N driving channels and M sensing channels, M and N being positive integers;

a sensing unit configured to receive sensing signals output by M−K sensing channels of the touch screen when the driving unit inputs the driving signals to the N driving channels, respectively, wherein M−K is less than or equal to A, the sensing unit is capable of receiving sensing signals output by at most A sensing channels at a time, and A is less than M, and K is less than N;

a switching unit configured to switch the N driving channels to N sensing channels, and switch K sensing channels in the M sensing channels except the M−K sensing channels to K driving channels;

the driving unit further configured to input driving signals to the K driving channels after the switching, respectively;

the sensing unit further configured to receive sensing signals output by the N sensing channels after the switching when the driving unit inputs the driving signals to the K driving channels after the switching, respectively; and a processing unit configured to determine touch information on the touch screen according to the sensing signals output by the M−K sensing channels and the sensing signals output by the N sensing channels after the switching.

10. The touch control chip according to claim 9, wherein the processing unit is configured to:

adjust the sensing signals output by the N sensing channels after the switching according to the sensing signals output by the M−K sensing channels; and determine the touch information on the touch screen according to the sensing signals output by the M−K sensing channels and the adjusted sensing signals output by the N sensing channels.

11. The touch control chip according to claim 10, wherein the processing unit is configured to:

adjust an average value of N sensing signals corresponding to i-th sensing channel in the K sensing channels to be equal to an average value of N sensing signals corresponding to any one of the M−K sensing channels, i being from 1 to K.

12. The touch control chip according to claim 11, wherein the processing unit is configured to:

calculate an adjustment parameter $P_i$ corresponding to the i-th sensing channel in the K sensing channels, wherein $P_i$ is equal to a ratio between the average value of the N sensing signals corresponding to any one of the M−K sensing channels and the average value of the N sensing signals corresponding to the i-th sensing channel; and adjust a signal value Q of each of the N sensing signals corresponding to the i-th sensing channel to $Q \times P_i$.

13. The touch control chip according to claim 12, wherein the driving unit inputs driving signals to the N driving channels and the K driving channels after the switching, respectively by using at least one of the following manners:

a single channel single frequency driving manner, a dual channel dual frequency driving manner, a multi-channel single frequency driving manner, and a multi-channel dual frequency driving manner.

14. The touch control chip according to claim 11, wherein the driving unit inputs driving signals to the N driving channels and the K driving channels after the switching, respectively by using at least one of the following manners:

a single channel single frequency driving manner, a dual channel dual frequency driving manner, a multi-channel single frequency driving manner, and a multi-channel dual frequency driving manner.

15. The touch control chip according to claim 10, wherein the driving unit inputs driving signals to the N driving channels and the K driving channels after the switching, respectively by using at least one of the following manners:

a single channel single frequency driving manner, a dual channel dual frequency driving manner, a multi-channel single frequency driving manner, and a multi-channel dual frequency driving manner.

16. The touch control chip according to claim 9, wherein the driving unit inputs driving signals to the N driving channels and the K driving channels after the switching, respectively by using at least one of the following manners:
a single channel single frequency driving manner, a dual channel dual frequency driving manner, a multi-channel single frequency driving manner, and a multi-channel dual frequency driving manner.

17. A touch detection apparatus, comprising a touch screen and a touch control chip;
wherein the touch control chip comprises:
a driving unit configured to input driving signals to N driving channels of the touch screen, respectively, wherein the touch screen has the N driving channels and M sensing channels, M and N being positive integers;
a sensing unit configured to receive sensing signals output by M−K sensing channels of the touch screen when the driving unit inputs the driving signals to the N driving channels, respectively, wherein M−K is less than or equal to A, the sensing unit is capable of receiving sensing signals output by at most A sensing channels at a time, A is less than M, and K is less than N;
a switching unit configured to switch the N driving channels to N sensing channels, and switch K sensing channels in the M sensing channels except the M−K sensing channels to K driving channels;
the driving unit further configured to input driving signals to the K driving channels after the switching, respectively;
the sensing unit further configured to receive sensing signals output by the N sensing channels after the switching when the driving unit inputs the driving signals to the K driving channels after the switching, respectively; and
a processing unit configured to determine touch information on the touch screen according to the sensing signals output by the M−K sensing channels and the sensing signals output by the N sensing channels after the switching;
wherein the touch screen comprises the driving channels and the sensing channels, the driving channels are configured to receive the driving signals output by the driving unit of the touch control chip, and the sensing channels are configured to output the sensing signals to the sensing unit of the touch control chip.

* * * * *